United States Patent [19]

Dash

[11] Patent Number: 4,825,458
[45] Date of Patent: Apr. 25, 1989

[54] SUBSCRIBER TELEPHONE EQUIPMENT TEST APPARATUS

[76] Inventor: Glen Dash, 201 Bingham Rd., Carlisle, Mass. 01741

[21] Appl. No.: 82,670

[22] Filed: Aug. 7, 1987

[51] Int. Cl.$^4$ .......................... H04M 1/24; H02M 7/00
[52] U.S. Cl. ........................................ 379/1; 379/28; 379/32; 324/111; 320/1

[58] Field of Search .................... 379/28, 387, 1, 32; 324/72, 98, 111, 123 R; 361/235; 307/108, 110, 150; 320/1; 370/13.1; 375/10

Primary Examiner—Stafford D. Schreyer
Attorney, Agent, or Firm—Wolf, Greenfield & Sacks

[57] ABSTRACT

A telephone network test apparatus for testing for a number of different conditions that can cause harm to a telephone network. Described herein is a circuit for measuring signal power level as well as a circuit for measuring surge voltages. Finally there is described a circuit for measurement of voltage balance.

14 Claims, 3 Drawing Sheets

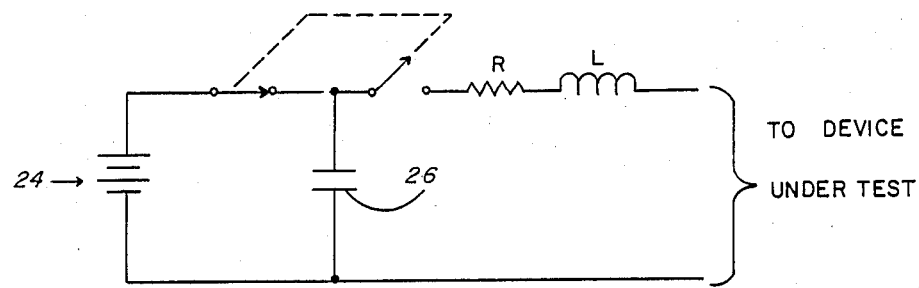
| TEST | V (volts) | I(A) | τ(μsec) | R(Ω) | L(μH) | C(μf) |
|------|-----------|------|---------|------|-------|-------|
| 1 | 800 | 200 | 10 X 560 | 4 | 40 | 160 |
| 2 | 1500 | 200 | 10 X 160 | 7.5 | 75 | 213 |
| 3 | 2500 | 1000 | 2 X 10 | 2.5 | .8 | 4.0 |
*Fig. 3*
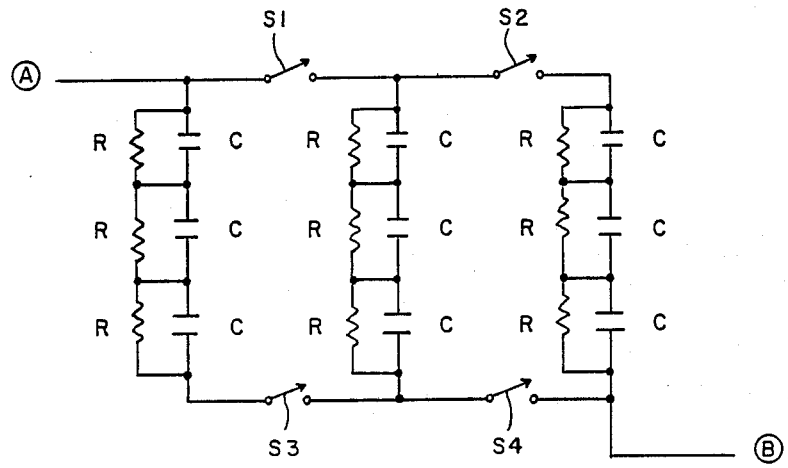
FOR TEST 1, CLOSE SWITCHES 1,2,3,4 (C=200 μf)
FOR TEST 2, CLOSE SWITCHES 2,3,4 (C= 44 μf)
FOR TEST 3, CLOSE SWITCHES 2,3 (C= 22 μf)
R= 330K
C=200μf/330V
*Fig. 4*
*Fig. 5*
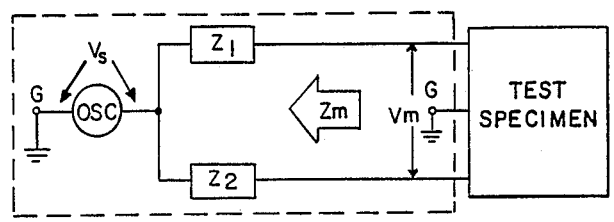

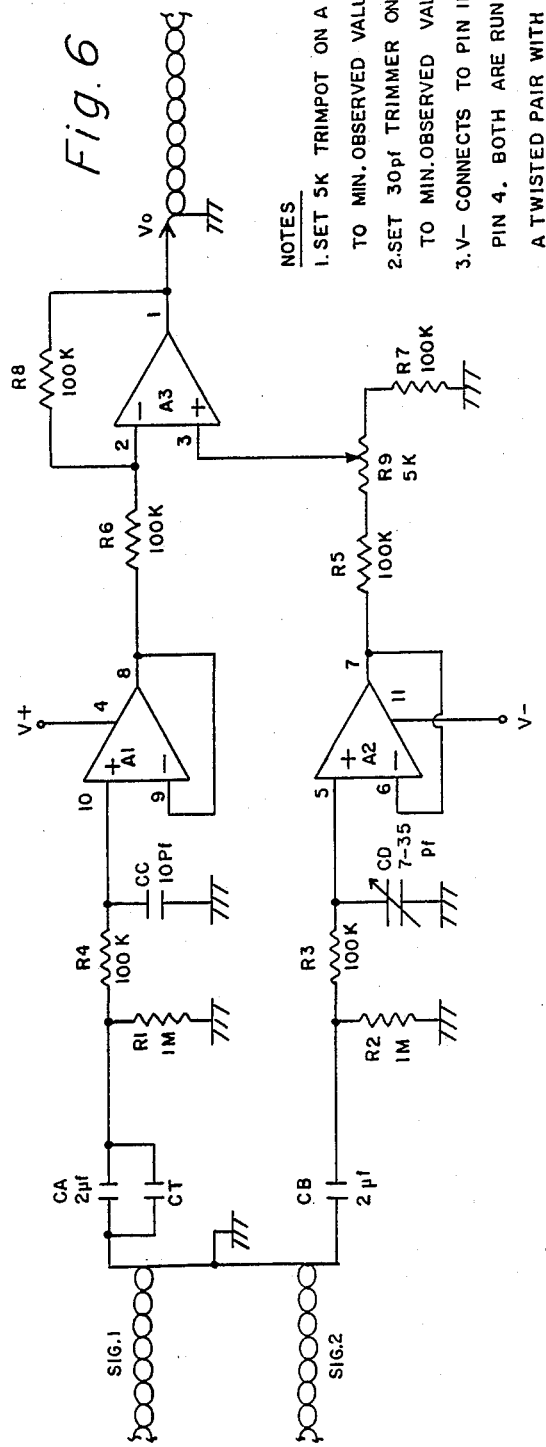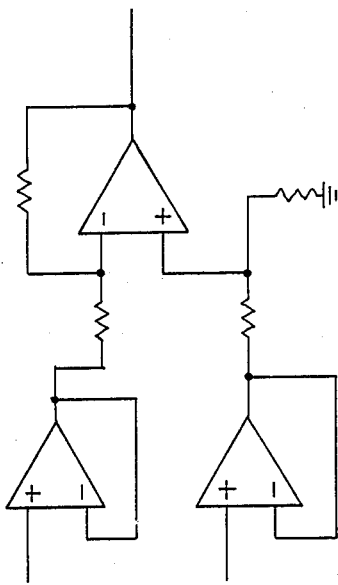

SUBSCRIBER TELEPHONE EQUIPMENT TEST APPARATUS

BACKGROUND OF THE INVENTION

1. Field Of The Invention

The present invention relates in general to a telephone network test apparatus, and pertains, more particularly to apparatus for signal power testing, for surge testing and for the measurement of signal balance.

2. Background Discussion

The proliferation of customer owned eguipment that attaches to telephone lines has caused concern that such devices could potentially harm the telephone network. Because of this, regulatory bodies around the world have adopted standards which require equipment to be evaluated for its potential to cause harm to the network. Such standards include FCC rules Part 68 in the United States, and Canadian Standard CS-03 in Canada. Among the harms to the network which have been identified are measurements of hazardous voltages and currents, signal power, response to lightening strike (surge test) and analysis of balance characteristics.

Accordingly, it is an object of the present invention to provide improved apparatus and in particular improved circuitry for measuring potential harm to telephone networks.

Another object of the present invention is to provide apparatus as in accordance with the preceeding object and which is of simplified construction and more convenient in use than existing techniques.

SUMMARY OF THE INVENTION

In accordance with the invention, there is provided apparatus for evaluation of telephone communication equipment for potential harm to the telephone network. One potential harm to the network is the transmission of signals which are stronger than the network can tolerate. Thus, in accordance with the first aspect of the invention there is provided a signal power measuring system for measuring both differential signals and common mode signals. More particularly, there is provided an impedance termination network connected between a device under test and a frequency selective volt meter. The network comprises first resistive means, second resistive means and third resistive means along with a first switch means having first, second and third positions corresponding to three successive frequency ranges. Means are provided for coupling the first, second and third resistive means to the respective first, second and third positions whereby the selection corresponds to resistive means selection. Each of the resistive means may comprise a pair of series connected resistors. There is also provided a second switch means having two poles with each pole for selection of either differential or common mode signals. The impedance termination network has the advantage of avoiding operator error and fatigue. It allows the use of untrained operators to perform signal power analysis and lends to easy automation of the test. In addition, it minimizes the number of components that are to be used to perform signal power analysis.

In accordance with a further aspect of the present invention there is provided a surge simulation circuit that includes a high voltage supply, a capacitor network and switch means enabling charging and discharging of the capacitor network. The capacitor network is charged from the high voltage supply and discharges into a load. The capacitor network comprises a first capacitance network, a second capacitance network, a third capacitance network and a switch network for interconnecting said capacitance networks in parallel between terminals of the circuit. The switch network includes a plurality of switches that may be selectively opened or closed depending upon the desired capacitance of the overall network.

In accordance with still a further aspect of the present invention there is provided a network for measuring signal balance across the telephone signal transmission pair. This network comprises a first amplifier means coupled to one input line and a second amplifier means coupled to the other input line. The outputs of the amplifier means coupled to a summing amplifier having two inputs coupled from the respective first and second amplifier means. There are also provided first and second input networks connected respectively between the input lines and the first and second amplifier means. The input networks each comprise an input capacitor connected in series with a phase shift compensation network.

BRIEF DESCRIPTION OF THE DRAWINGS

Numerous other objects, features and advantages of the invention are now apparent upon a reading of the following detailed description taken in conjunction with the following drawings, in which:

FIG. 3 is a circuit diagram of a surge simulation circuit;

FIG. 4 is a circuit diagram showing the implementation of the charging capacitance network;

FIG. 5 is a block diagram showing a circuit for balance measurement;

FIG. 6 is a circuit diagram of a circuit for measuring differential voltages in the block diagram of FIG. 5;

FIG. 7 illustrates a standard instrumentation amplifier.

DETAILED DESCRIPTION

There is now described herein in further detail a number of different circuits for carrying out certain testing and evaluation of telephone communication equipment. There is described herein a signal power analyzer, a circuit for measuring surge and furthermore a circuit for measuring differential signal balance.

Figure 1:
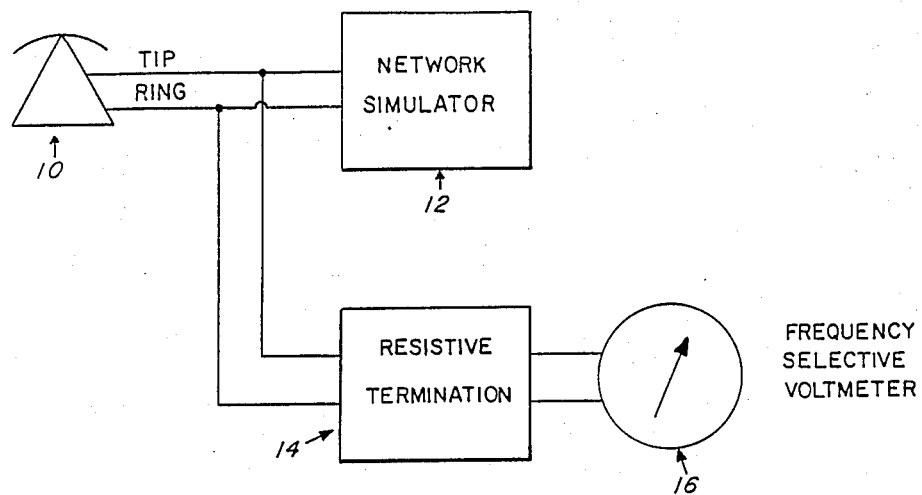
FIG. 1 is a block diagram illustrating a system for evaluating or measuring signal power in a telephone network.

One potential harm to the telephone network is the transmission of signals which are stronger than the network can tolerate. These include "In-band" signals (100 to 4.0 kHz) and "Out of-band" signals (4 kHz–0.6 MHz). The set up used to evaluate signal power is illustrated in FIG. 1. This includes the telephone equipment illustrated at 10, a network simulator 12, a resistive termination network 14, and a frequency selective volt meter 16. The measurement of both differential signals (metallic) and common mode signals (longitudinal) are required by most worldwide specifications.

For each frequency range, measurements are made into a specified impedance. The required impedances for FCC rules Part 68 are shown in Table I. For example, when measuring metallic signals between 0.2 and 4 kHz, a 600 ohm impedance is used. Different impedances are required depending on whether the test is longitudinal or metallic, and depending on the frequency range that is being analyzed. In addition, a special filter with a characteristic of f divided by 4000 (f in Hertz) is required for measurement of longitudinal signals in the 0.1-4 kHz range.

Figure 2:
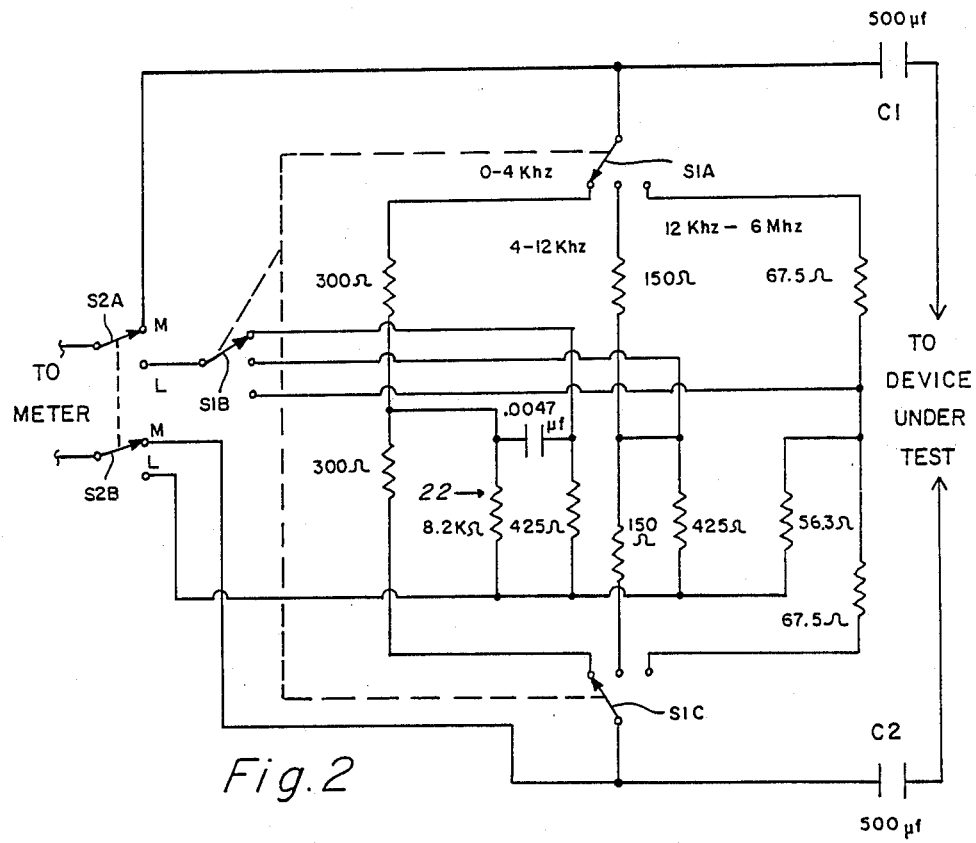
FIG. 2 is a circuit diagram of the resistive termination of FIG. 1.

The multiplicity of impedances required makes the testing time consuming. It also increases the chance of operator error. In order to speed testing and minimize the components used, the novel circuitry in FIG. 2 is employed. This circuitry makes up the resistive termination 14 of FIG. 1. Signals from the device under test pass through two 500 microfarad non-polar capacitors C1 and C2 to the resistive termination network. This capacitor blocks low frequency and DC signals. Switch S1 is a three-pole, three-throw switch. When set in the 0 to 4 kHz position, the metallic impedance is 600 ohms and longitudinal impedance 500. In addition, an 8.2K resistor and 0.0047 microfarad capacitor comprise the f divided by 4000 filters as illustrated at 22 in FIG. 2. By switching switch S2 to the appropriate position (M for metallic, L for longitudinal), measurements of metallic or longitudinal signals can be conveniently made. Similarly, switch S1 allows convenient selection of the right impedance ranges simply by knowing the frequency to be measured, and by setting switch S1 to the appropriate position (0 to 4 kHz, 4 to 12 kHz or 12 kHz to 6 MHz).

TABLE 1
REQUIRED IMPEDANCE

| Metallic Tests | |
| --- | --- |
| Frequency Range | Metallic Impedance |
| .2-4 kHz | 600 |
| 4-12 kHz | 300 |
| 12 kHz-6 MHz | 135 |
| Longitudinal Tests | |
| Frequency Range | Longitudinal Impedance |
| .1-4 kHz | 500 ohms* |
| 4-12 kHz | 500 ohms |
| 12 kHz-6 MHz | 90 ohms |

*Signal also passed through a filter with characteristics of $\frac{f}{4000}$ where f is frequency in Hertz.

This switching arrangement of FIG. 2 has the advantage of avoiding operator error and fatigue. It allows the use of untrained operators to perform signal power analysis and lends to easy automation of this test. In addition, it minimizes the number of components which must be used to perform signal power analysis.

Another potential harm to the network results from lightening surges on the telephone lines. If these surges damage customer premise equipment, potential harms to the network results.

The rules in FCC Part 68 specify three surges to be applied to customer premise equipment. An 800 volt metallic, 1500 volt longitudinal, and 2500 volt phase-to-neutral surge are applied. The required voltage current and timing characteristics are shown in Table 2.

In accordance with the invention, that circuit which can be used to apply and simulate these surges is shown in FIG. 3. Here, a high voltage supply 24 initially charges a capacitor 26. When the capacitor 26 is discharged, a current pulse passes to the load. The required R, L and C values are shown in FIG. 3.

TABLE 2

| Test No. | SURGES REQUIRED | | | |
| --- | --- | --- | --- | --- |
| | V | I | τ (usec) | Notes |
| 1 | 800 V | 200 A | 10 × 560 | Metallic |
| 2 | 1500 V | 200 A | 10 × 160 | Longitudinal |
| 3 | 2500 V | 1000 A | 2 × 10 | Phase to Neutral |

In practice, building apparatus which correctly simulates lightning surges is difficult. Capacitors must be able to survive high voltages, high currents and enormous discharge energies. Normal electrolytic capacitors are generally not suitable for this purpose since the welds that hold the capacitor together can be destroyed by the high current surges. Oil filled and other similar capacitors are too bulky to be mounted in a machine of convenient size and shape. Thus, in accordance with the invention a multiplicity of smaller capacitors are chosen to simulate the lightening surge.

The circuitry of FIG. 4 illustrates an implementation in accordance with the invention which minimizes the size and cost of the required capacitors. Nine 200 microfarad 330 volt capacitors C are employed along with four switches (1-4) and nine resistors R. The switches allow the bank of capacitors to be set up for different values of working voltage and capacitance depending on their switch settings. In order to simulate a 200 microfarad/990 volt capacitor required for Test 1 (800 V metallic), all four switches are closed. This places the capacitors in parallel and allows construction of an ideally suited capacitor. Closing switches 2, 3 and 4 produces a 44 microfarad capacitor with a 1980 volt rating suitable for performing metallic tests. Finally, closing switches 2 and 3 places all the capacitors in series, producing a 22 microfarad 2970 volt capacitor which exceeds the values required for phase-to-neutral testing.

The 330K resistor R placed across the capacitors C serves as a bleeding function. It also serves to distribute the DC voltages evenly among the capacitors. Without this resistor in place, there is no continuous DC current flow and no way to ensure that the DC voltages do indeed divide evenly among the capacitors.

Most telephone systems which exist today work on a system of an open wire transmission line system. Such a system requires balance signals to be fed to the transmission pair. Because of this, balance considerations are important. The impedance to earth ground from one of the signal carrying wires must be on the same order as the impedance to ground of the other wire. If, for example, one of the two wires has a relatively low impedance to ground (relative to the characteristic impedance of the transmission line), then imbalance results, causing the production of common mode signals which can either transmit to other signal pairs or increase susceptability of the unbalanced line to common mode noise signals. Harm on the telephone line is the result of such imbalance.

For this reason, specifications require the measurement of balance. Generally, balance on the order of 40-60 dB is required. One such standard in IEEE 455 (1976). That standard calls out the measurement instrumentation shown in FIG. 5. Not shown is the required differential amplifier needed to measure signal VM.

FIG. 6 shows a novel circuit in accordance with the present invention which serves as the differential amplifier to measure VM. This differential amplifier has unusual characteristics. Its common mode rejection ratio is on the order of 80 dB from 100 Hz to 1 kHz, and 60 dB form 1 kHz to 4 kHz. In addition, the differential amplifier is to withstand common mode voltages of up to 100 volts. The combination of these characteristics makes the design of such a differential amplifier difficult.

A standard instrumentation amplifier which consists of the circuitry shown in FIG. 7 will not permit adequate balance, nor will it generally be able to withstand high common mode voltages. Thus, the circuit of FIG. 6 is employed in this invention in order to meet these characteristics. First, two 2 microfarad mylar capacitors CA and CB are placed on the input circuitry. Twisted pair feeds connect to these capacitors. These capacitors are matched externally using a capacitance meter. Capacitor CT is bridged across the smaller of the two capacitors in order to match their values to within 0.1%.

Despite this matching, some phase shift still occurs due to the input capacitance due to the twisted pair, mismatch of the 2 microfarad capacitors, or of the one meg resistor (R1 and R2) shown in the drawing. To compensate for this phase shift, a phase shift compensation network consisting of a 100K resistor (R3 and R4) and a small capacitor (CC and CD) is used. On one side of the circuitry, a 10 picofarad capacitor CC with zero temperature drift is connected. On the other side of the circuitry, a variable capacitor CD is connected. This variable capacitor is adjusted to eliminate the phase shift differential entering the two input op-amps A1 and A2.

TABLE 3
REQUIRED BALANCE

| Frequency Range (Hz) | Balance Required (dB) |
|---|---|
| 100–1000 | 60 |
| 1000–4000 | 40 |

The two input op-amps A1 and A2 serve as followers and feed two resistors (R5 and R6) to a summing amplifier A3. Here, problems with common mode rejection are due to mismatch of the 100K resistors (R6–R8). A 5K trim potentiometer R9 allows nulling of this resistive mismatch. The output signal is then fed via the twisted pair to metering circuitry.

Enhancing common mode rejection characteristics is also the use of the 100K resistors, all confined in one dual in-line package. The op-amps also consist of matched elements on a single DIP. For low noise characteristics, an operational amplifier such a the Quad TLD74CN is used.

The differential amplifier therefore improves on a standard instrumentation amplifier design by identifying those causes of phase shift and resistive mismatch and applying trimmer elements at key locations in order to enhance the capability of the design.

Having now described a limited number of embodiments of the present invention, it should now be apparent to those skilled in the art that numerous other embodiments and modifications thereof are conteplated as falling within the scope of the present invention as defined by the appended claim.

What is claimed is:

1. An impedance termination network connected between a device under test and a frequency selective voltmeter, said network comprising, first resistive means, second resistive means, third resistive means, a first switch means having first, second and third positions corresponding to three successive frequency ranges, means coupling the first, second and third resistive means to the respective first, second and third positions whereby the position selection corresponds to resistive means selection, and a second switch means having two positions with each position for selection of either differential or common mode signals.

2. An impedance termination network as set forth in claim 1 wherein each resistive means comprises a pair of series connected resistors.

3. An impedance termination network has set forth in claim 2 wherein said first switch means has at least two separate poles having defined thereat said first, second and third positions and further including a first capacitor coupled to a first pole of said first switch means and a second capacitor coupled to a second pole of said first switch means.

4. An impedance termination network as set forth in claim 3 including a third pole of said first switch means and a filter means connected to the third pole of said first switch means.

5. A surge simulation circuit including a high voltage supply, a capacitor network, switch means for enabling charging and discharging of said capacitor network, said capacitor network being charged from said high voltage supply and discharged into a load, said capacitor network comprising, a first capacitance network, a second capacitance network, a third capacitance network, a switch network for interconnecting said capacitance networks in parallel between terminals of the capacitor network, said switch network including a plurality of switches that may be selectively opened or closed depending upon the desired capacitance of the overall network.

6. A surge simulation circuit as set forth in claim 5 further including a resistance element an inductance element in series with said capacitor network and coupling to a device under test.

7. A surge simulation circuit as set forth in claim 6 wherein each said capacitance network comprises a plurality of series connected capacitors.

8. A surge simulation circuit as set forth in claim 7 wherein said plurality of switches comprise four switches forming with said capacitance networks, a ladder network.

9. A surge simulation circuit as set forth in claim 8 further including a resistor in parallel with each of said capacitors.

10. A network for measuring signal balance across a telephone signal transmission pair, comprising, a first amplifier means coupled to one input line, a second amplifier means coupled to the other input line, a summing amplifier having two inputs coupled from the respective first and second amplifier means, first and second input networks each comprising an input capacitor connected in series with a phase shift compensation network.

11. A network as set forth in claim 10 further including a trimmer capacitor connected in parallel with one of said input capacitors so as to match capacitance values to within on the order of 0.1%.

12. A network as set forth in claim 11 wherein said phase shift compensation network comprises an R-C circuit.

13. A network as set forth in claim 12 wherein one of the capacitors of said R-C circuit is a variable capacitor.

14. A network as set forth in claim 13 further including a potentiometer coupling from the output of said second amplifier means to one of the inputs of the said summing amplifier.

* * * * *